(12) United States Patent
Hwang

(10) Patent No.: US 9,494,137 B2
(45) Date of Patent: Nov. 15, 2016

(54) ROTOR FOR WIND POWER GENERATION AND WIND POWER GENERATION APPARATUS HAVING THE SAME

(75) Inventor: Ji Seon Hwang, Incheon (KR)

(73) Assignee: ENERGYN INC., Incheon (KR)

( * ) Notice: Subject to any disclaimer, the term of this patent is extended or adjusted under 35 U.S.C. 154(b) by 1029 days.

(21) Appl. No.: 13/518,886

(22) PCT Filed: Jun. 21, 2010

(86) PCT No.: PCT/KR2010/004003
§ 371 (c)(1),
(2), (4) Date: Jun. 24, 2012

(87) PCT Pub. No.: WO2011/078451
PCT Pub. Date: Jun. 30, 2011

(65) Prior Publication Data
US 2012/0280510 A1  Nov. 8, 2012

(30) Foreign Application Priority Data

Dec. 24, 2009 (KR) .................. 10-2009-0131274
Dec. 24, 2009 (KR) .................. 10-2009-0131286
Apr. 26, 2010 (KR) .................. 10-2010-0038520

(51) Int. Cl.
*F03D 3/06* (2006.01)

(52) U.S. Cl.
CPC ........... *F03D 3/067* (2013.01); *F05B 2230/80* (2013.01); *F05B 2240/311* (2013.01); *F05B 2250/60* (2013.01); *Y02E 10/721* (2013.01); *Y02E 10/74* (2013.01); *Y02P 70/523* (2015.11)

(58) Field of Classification Search
CPC ........ F03D 3/067; F03D 3/062; F03D 3/064; F05B 2240/311; F05B 2230/80; F05B 2250/60
USPC .......................................................... 416/119
See application file for complete search history.

(56) References Cited

U.S. PATENT DOCUMENTS

| 3,129,769 | A | * | 4/1964 | Hofbauer et al. ............. 416/24 |
| 3,877,836 | A | * | 4/1975 | Tompkins ..................... 416/119 |
| 4,247,253 | A | * | 1/1981 | Seki et al. .................... 416/44 |
| 4,299,537 | A | * | 11/1981 | Evans .......................... 416/119 |
| 4,383,801 | A | * | 5/1983 | Pryor ............................ 416/17 |
| 5,193,978 | A | * | 3/1993 | Gutierrez ...................... 416/24 |
| 5,503,525 | A | * | 4/1996 | Brown et al. .................. 416/24 |
| 6,139,268 | A | * | 10/2000 | Murawski et al. ............ 416/23 |

(Continued)

FOREIGN PATENT DOCUMENTS

| JP | 2003-269320 A | 9/2003 |
| JP | 2005-248935 A | 9/2005 |
| JP | 2007-146851 A | 6/2007 |

*Primary Examiner* — Sean J Younger
(74) *Attorney, Agent, or Firm* — Novick, Kim & Lee, PLLC; Jae Youn Kim

(57) ABSTRACT

Disclosed are a rotor for wind power generation which converts wind power into electric energy, and a wind power generation apparatus having the same. The rotor for wind power generation includes a vertically or horizontally oriented rotating shaft, a plurality of main blades conically installed to the rotating shaft so as to be equidistantly spaced apart from one another, and an auxiliary blade coupled to each of the main blades, the auxiliary blade being configured to be bent according to the direction of wind. Through this configuration, it is possible to reduce an initial starting wind velocity and achieve increased lift and drag force, resulting in an enhancement in power generation efficiency.

6 Claims, 9 Drawing Sheets

(56) References Cited

U.S. PATENT DOCUMENTS

| | | |
|---|---|---|
| 6,206,642 B1 * | 3/2001 | Matheny et al. ............. 416/230 |
| 6,247,670 B1 * | 6/2001 | Eliahou-Niv et al. ........ 244/204 |
| 7,549,841 B1 * | 6/2009 | Marussich ................. 415/173.3 |
| 8,657,575 B2 * | 2/2014 | Morris ............................ 416/79 |
| 2009/0028705 A1 * | 1/2009 | Meldgaard et al. ............ 416/23 |

* cited by examiner

ROTOR FOR WIND POWER GENERATION AND WIND POWER GENERATION APPARATUS HAVING THE SAME

TECHNICAL FIELD

The present invention relates to a rotor for wind power generation, which converts wind power into electric energy, and a wind power generation apparatus having the same.

BACKGROUND ART

In general, a wind power generation apparatus is an apparatus that generates rotational power using lift and drag force caused when wind collides with blades and drives an electric generator using the rotational power so as to generate electricity.

Wind power generation apparatuses are basically classified, according to the orientation of a shaft, into a horizontal shaft type wind power generation apparatus and a vertical shaft type wind power generation apparatus.

The horizontal shaft type wind power generation apparatus is typically configured in such a way that a rotor having three blades is rotated about a horizontal shaft to drive a generator. This requires relatively strong wind in order to rotate the rotor, and therefore is installed along a shoreline and at high altitude areas where a great amount of wind blows. This horizontal shaft type wind power generation apparatus is suitable for large scale power generation because it is fabricated into a large size so as to generate power even with low wind speed.

On the other hand, the vertical shaft type wind power generation apparatus may rotate a rotor with an even lower amount of wind than the horizontal shaft type wind power generation apparatus, and thus may be installed at various places relatively irrespective of location. Further, since the vertical shaft type wind power generation apparatus may be fabricated in a small size, increasing generation efficiency of the vertical shaft type wind power generation apparatus has been actively studied.

A conventional vertical shaft type wind power generation apparatus includes a rotor to which a plurality of blades is vertically coupled, and a generator connected to the rotor. However, this conventional configuration has a problem in that the blades vertically coupled to the rotor are fixedly installed to disable adjustment in angle, which makes it impossible to generate optimal rotational power considering the direction of wind, resulting in restrictive generation efficiency.

Although adjusting the angle of the blades may be attempted, this may be very time consuming work because dismantling and reinstalling the blades after setting the angle of the respective blades is necessary. Moreover, measuring the angle on a per blade basis is very troublesome.

The conventional vertical shaft type wind power generation apparatus further has a problem in that an initial wind velocity required to start the rotor is high since the blades have the same standardized shape and have difficulty in adaptively reacting various changes of wind.

DISCLOSURE

Technical Problem

Therefore, the present invention is devised to solve the above described problems of the related art, and is an aspect of the present invention to provide a rotor for wind power generation, which may reduce an initial starting wind velocity, may achieve an enhancement in power generation efficiency owing to increased lift and drag force of the rotor, and may ensure easy adjustment in the angle of blades, and a wind power generation apparatus having the same.

Technical Solution

In accordance with one aspect of the present invention, a rotor for wind power generation includes a vertically or horizontally oriented rotating shaft, a plurality of main blades conically installed to the rotating shaft so as to be equidistantly spaced apart from one another, and at least one auxiliary blade coupled to each of the main blades, the auxiliary blade being configured to be bent according to the direction of wind.

The auxiliary blade may be coupled to a distal end of the main blade so as to extend from the main blade.

The main blade may have a boss insertion recess formed at the distal end thereof, and the auxiliary blade may have an insertion boss formed at a distal end thereof, such that the main blade and the auxiliary blade are coupled to each other as the insertion boss is inserted into the boss insertion recess.

The auxiliary blade may be coupled to an outer surface of the main blade and may extend longer beyond the distal end of the main blade.

The auxiliary blade may be coupled to an inner surface of the main blade and may extend longer beyond the distal end of the main blade.

The at least one auxiliary blade may include a pair of auxiliary blades installed respectively to an inner surface and an outer surface of the main blade so as to face each other, the pair of auxiliary blades being configured to come into contact at distal ends thereof with each other under the influence of wind, thereby defining an airfoil structure.

The pair of auxiliary blades may have different lengths.

The at least one auxiliary blade may include a plurality of auxiliary blades arranged in a longitudinal direction of the main blade.

The at least one auxiliary blade may include a plurality of auxiliary blades tilted to a distal end of the main blade.

The tilt angle of the auxiliary blade may be within a range of 5 degrees to 60 degrees with respect to an outer surface of the main blade.

The auxiliary blade may be pivotally rotatably coupled to the main blade via a hinge.

A thickness of the auxiliary blade may be gradually reduced with decreasing distance to a distal end thereof.

The auxiliary blade may be coated with a soft material to reduce friction noise in the wind.

In accordance with another aspect of the present invention, a rotor for wind power generation includes a vertically or horizontally oriented rotating shaft, and a plurality of main blades conically installed to the rotating shaft so as to be equidistantly spaced apart from one another, wherein the main blade is provided at an outer surface thereof with a plurality of protruding pieces tilted to a distal end of the main blade.

The tilt angle of the protruding pieces may be within a range of 5 degrees to 60 degrees with respect to the outer surface of the main blade The protruding pieces may take the form of pointed protrusions.

The main blade and the protruding pieces may take the form of a plate.

The protruding pieces may have a streamlined profile when outer ends thereof are connected to one another.

In accordance with a further aspect of the present invention, a wind power generation apparatus includes the rotor according to any one of claims 1 to 18, and a generator to be driven by rotational power of the rotor, wherein the rotor further includes a support member that connects the rotating shaft and the main blades to each other, each of the main blade being pivotally rotatably coupled to the support member using a hinge, and wherein an angle meter is installed at a coupling region between the support member and the main blade to indicate a pivotal rotation angle of the main blade.

The main blade may further include a bracket coupled thereto, the bracket being also coupled to the support member via a hinge, and the angle meter may include graduations marked on any one of the bracket and the support member, and an index member provided at the other one to point out the graduations.

Advantageous Effects

According to the present invention, as a result of providing an auxiliary blade which is flexible so as to be bent by wind, it is possible to remarkably reduce an initial starting wind velocity and to generate optimal lift and drag force considering the direction of wind, resulting in an enhancement in power generation efficiency.

Further, a main blade is provided with protruding pieces such that wind is caught between the blade and the protruding pieces, which may result in increased lift and drag force.

Furthermore, an angle meter may be advantageously provided to facilitate easy adjustment in the angle of the blades.

DESCRIPTION OF REFERENCE NUMERALS

Figure 1:
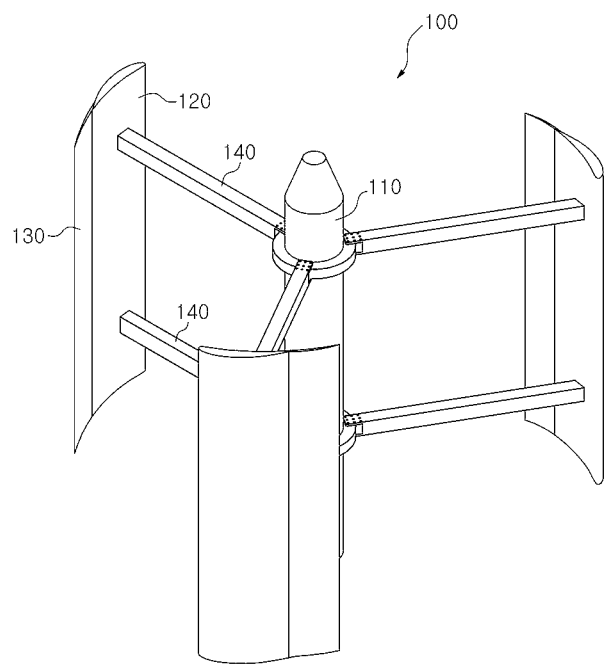
FIG. 1 is a plan view illustrating a rotor for wind power generation according to an exemplary embodiment of the present invention.

100: rotor for wind power generation
110: rotating shaft
120: main blade
121: boss insertion recess
123: hinge assertion recess
125: bracket
126: guide hole
128, 128: protruding piece
130, 135, 230, 330, 430, 530: auxiliary blade
131: insertion boss
140: support member
150: angle meter
151: graduation
153: index member
155: listening amber
200: wind power generation apparatus
210: generator
531: hinge
d: tilt angle of auxiliary blade
e: tilt angle of protruding piece
H: hinge

BEST MODE

Hereinafter, the exemplary embodiments of the present invention will be described in detail with reference to the accompanying drawings.

First, according to the exemplary embodiment of the present invention, the present invention relates to an H-rotor Gyro-mill type wind power generation apparatus configured to be rotated about a vertical shaft, but may be applied to various other shapes of wind power generation apparatuses, such as, for example, helical H-rotor type, Darrieus type, cross-flow type, and Savonius type wind power generation apparatuses.

In the following description, among both surfaces of a main blade 120, one surface facing radially outward of a rotating shaft 110 is referred to as an outer surface, and the other surface facing the rotating shaft 110 is referred to as an inner surface.

Figure 2:
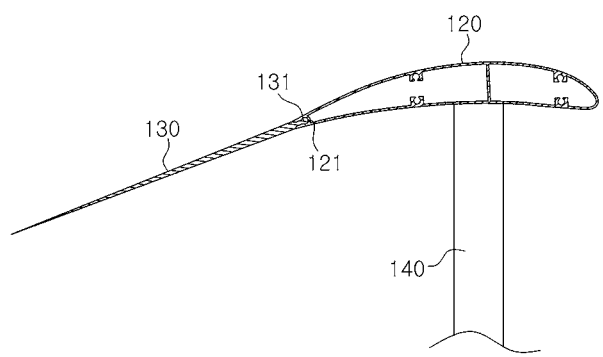
FIG. 2 is an enlarged view illustrating a main blade provided at the rotor for wind power generation according to the exemplary embodiment of the present invention.
Figure 3:
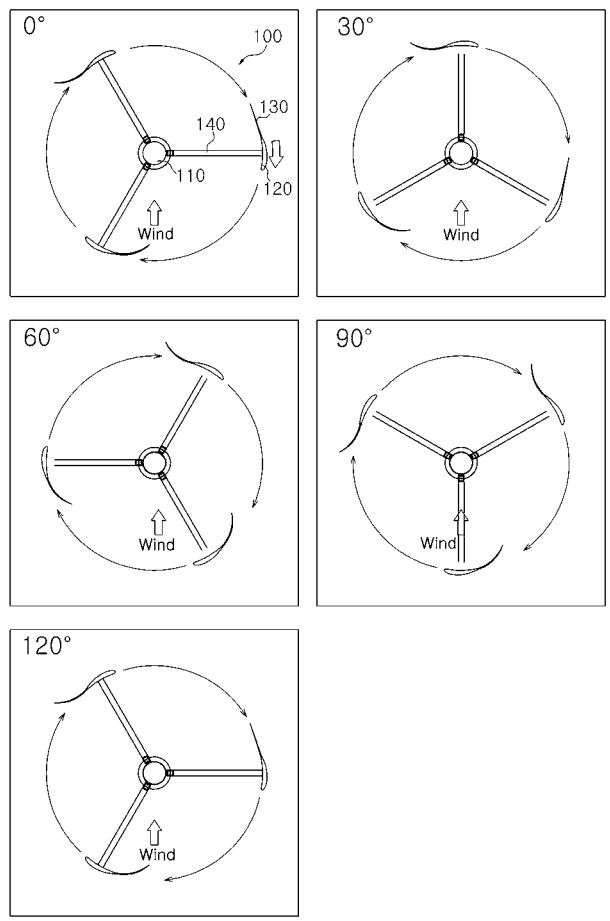
FIG. 3 is a view illustrating operational modes of the rotor for wind power generation according to the exemplary embodiment of the present invention as shown in FIG. 2.

FIG. 1 is a plan view illustrating a rotor for wind power generation according to an exemplary embodiment of the present invention, FIG. 2 is an enlarged view illustrating a main blade provided at the rotor for wind power generation according to the exemplary embodiment of the present invention, and FIG. 3 is a view illustrating operational modes of the rotor for wind power generation according to the exemplary embodiment of the present invention as shown in FIG. 2.

As shown in FIGS. 1 and 2, the rotor 100 for wind power generation according to the exemplary embodiment of the present invention may include the rotating shaft 120. The rotating shaft 120 may serve to drive a generator 210 via rotation thereof, and the generator will be described hereinafter. The rotating shaft 120 may be directly coupled to a drive shaft of the generator 210, or may be directly connected to the rotating shaft 120 by means of, for example, a gear, a sprocket, or a pulley, so as to transmit rotational power thereto.

Meanwhile, the rotating shaft 110 may be installed orthogonally to the ground.

The rotor 100 for wind power generation may include a plurality of main blades 120. The main blades 120 generate lift and drag force from wind colliding therewith, and may be concentrically spaced apart from one another by a constant distance. In the exemplary embodiment, three main blades 120 are installed orthogonally to the ground and are arranged by a distance of 120 degrees about the rotating shaft 110 such that inner surfaces of the main blades 120 face the rotating shaft 110.

The main blade 120 may take the form of a plate, and may have a streamlined cross section. In the case in which the main blade 120 has a streamlined cross section, the inner surface and the outer surface of the main blade 120 may have the same curvature on the basis of a center axis of the main blade, or any one of the inner surface and the outer surface may be inwardly curved toward the center of the main blade 120.

In the exemplary embodiment of the present invention, the main blade 120 has the inwardly curved inner surface. By providing the main blade 120 with the curved inner or outer surface, it is possible to increase a contact area between the main blade 120 and wind, thereby achieving an increase in lift and drag force.

The main blade 120 may be fabricated by extrusion molding, and may be formed of a light metal, synthetic resin, hard rubber, fiber composite material, or mixtures thereof.

The rotor 100 for wind power generation may further include auxiliary blades 130. The auxiliary blades 130 may be formed of a flexible material so as to be flexibly bent according to the direction of wind. The flexible auxiliary blades 130 may also serve to reduce an initial starting window velocity of the rotor. That is, the flexible auxiliary blades assist the rotor 100 in being more easily rotated with a lower amount of wind.

The auxiliary blade 130 may take the form of a plate, and may be coupled to a distal end of the main blade 120. In this case, a vertical length of the auxiliary blade 130 may be equal to a vertical length of the main blade 120. When viewed the auxiliary blade 130 from the top, a thickness of the auxiliary blade 130 may be constant, or may be gradually reduced toward an outer end thereof, which ensures that the auxiliary blade is flexibly bent according to the direction of wind.

To realize coupling between the main blade 120 and the auxiliary blade 130, the main blade 120 is provided at the distal end thereof with boss insertion recesses 120, and the auxiliary blade 130 is provided with insertion bosses 131, such that the insertion bosses 131 are inserted into the boss insertion recesses 121.

The auxiliary blade 130 may be formed of an elastic board material, synthetic resin, fiber composite material, synthetic rubber, natural rubber, or composites thereof, which are suitable to provide the auxiliary blade with flexibility. To reduce noise generated when the auxiliary blade 130 is bent upon colliding with wind, the auxiliary blade 130 may be coated with a soft material, for example, synthetic resin, synthetic rubber, natural rubber, urethane, silicone, or composites thereof.

The rotor 100 for wind power generation may further include at least one support member 140. The support member 140 may be used to connect the main blades 120 to the rotating shaft 110. The support member 140 may take the form of a disc such that the plurality of main blades 120 is coupled to the single support member 140 that connects the plurality of main blades 120 and the rotating shaft 110 to each other, or may include a plurality of support members 140 to connect the respective main blades 120 to the rotating shaft 110.

The support member 140 has a streamlined cross section, which may minimize wind resistance during rotation of the rotor 100 for wind power generation.

FIG. 3 is a view illustrating operational modes of the rotor for wind power generation according to the exemplary embodiment of the present invention. FIG. 3 illustrates differently rotated states of the rotor for wind power generation by an angle of 30 degrees from 0 degrees to 120 degrees.

As shown in FIG. 3, assuming that wind blows to the rotor 100 for wind power generation in a given direction, the auxiliary blade 130 must be flexibly bent according to the direction of wind, in order to reduce initial air drift and to generate optimal lift and drag force considering the direction of wind.

For example, on the basis of the auxiliary blade 130 located in a range from the zero degree position to the 3 o'clock position, the auxiliary blade 130 at the zero degree position is aligned on the straight line of the main blade 120 so as not to be affected by wind resistance. On the other hand, when rotated by an angle of 120 degrees, the auxiliary blade 130 is bent to a direction in which wind blows, thereby acting to increase lift and drag force and minimizing wind resistance in a rotating direction of the main blade.

Accordingly, by installing the auxiliary blade 130 to the distal end of the main blade 120, it is possible not only to increase a contact area with wind, thereby achieving an increase in lift and drag force, but also to ensure that wind resistance in a rotating direction of the main blade 120 is minimized owing to bending of the auxiliary blade 130, resulting in an enhancement in generation efficiency.

Figure 4:
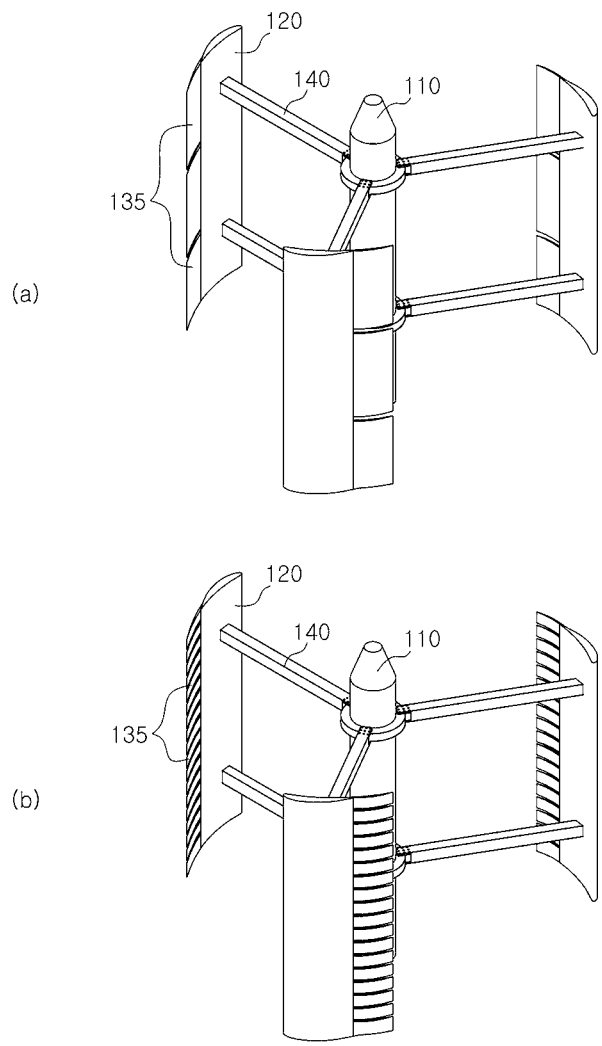
FIG. 4 is a perspective view illustrating a first alternative embodiment of an auxiliary blade provided at the rotor for wind power generation according to the exemplary embodiment of the present invention.
Figure 5:
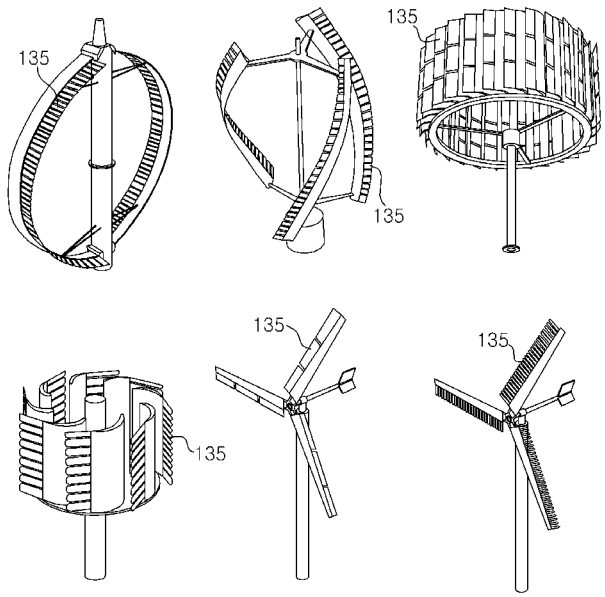
FIG. 5 is a perspective view illustrating application examples of the auxiliary blade of the first alternative embodiment with respect to a variety of rotors for wind power generation.

FIG. 4 is a perspective view illustrating a first alternative embodiment of the auxiliary blade provided at the rotor for wind power generation according to the exemplary embodiment of the present invention, and FIG. 5 is a perspective view illustrating application examples of the auxiliary blade of the first alternative embodiment with respect to a variety of rotors for wind power generation.

As shown in FIG. 4, the auxiliary blade 135 according to the first alternative embodiment has approximately the same configuration as the auxiliary blade 130 of the above described embodiment, except for the fact that a plurality of auxiliary blades 135 may be installed in a vertical longitudinal direction of the main blade 120. FIG. 4(a) is a perspective view illustrating three auxiliary blades installed to the main blade, and FIG. 4(b) is a perspective view illustrating a greater number of auxiliary blades installed to the main blade.

As shown in FIG. 4, in the case in which the plurality of auxiliary blades 135 is installed to the main blade 120, for example, even when the strength of wind is different according to heights or even under a turbulent wind flow condition, the respective auxiliary blades 130 installed to the main blade 120 having a long length may be differently bent according to different heights, which may minimize resistance of the rotor 100 for wind power generation in a rotating direction and increase lift and drag force, resulting in an enhancement in power generation efficiency.

As shown in FIG. 5, the auxiliary blades 135 according to the first alternative embodiment, for example, may be applied to a variety of rotors for wind power generation, such as H-rotor type, Darrieus type, cross-flow type, Savonius type rotors.

Figure 6:
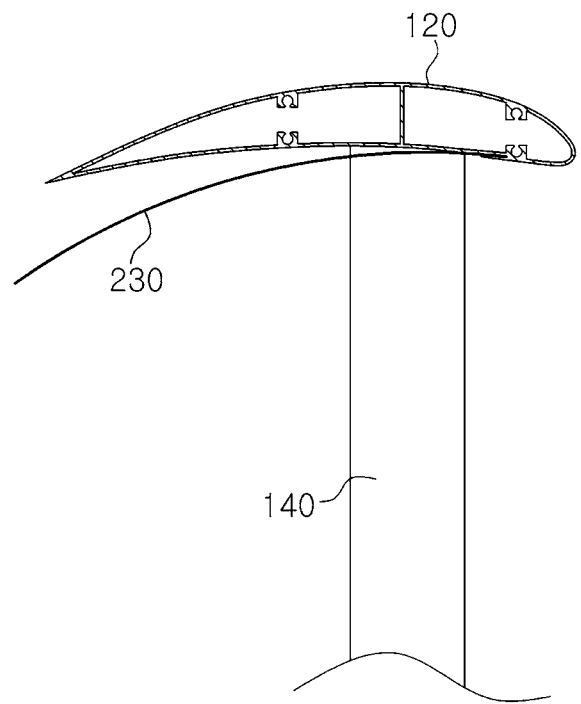
FIG. 6 is an enlarged view illustrating a second alternative embodiment of an auxiliary blade provided at the rotor for wind power generation according to the exemplary embodiment of the present invention.

FIG. 6 is an enlarged view illustrating a second alternative embodiment of an auxiliary blade provided at the rotor for wind power generation according to the exemplary embodiment of the present invention.

As shown in FIG. 6, the auxiliary blade 230 according to the second alternative embodiment has approximately the same configuration as the auxiliary blade 130 of the above described embodiment, except for the fact that the auxiliary blade may be coupled to the inner surface of the main blade 120. When viewed from the top, the auxiliary blade 230 of the second alternative embodiment may extend longer beyond the distal end of the main blade 120.

The auxiliary blade 230 having the above described configuration may come into close contact with the inner surface of the main blade 120 when the main blade 120 is oriented to face the wind, thereby serving to reduce wind resistance of the main blade 120. Also, in the case in which the rear surface of the main blade 120 is oriented to face the wind, the auxiliary blade 230 is separated from the main blade 120 such that wind is caught therebetween, which may increase lift and drag force, resulting in an enhancement in power generation efficiency.

Figure 7:
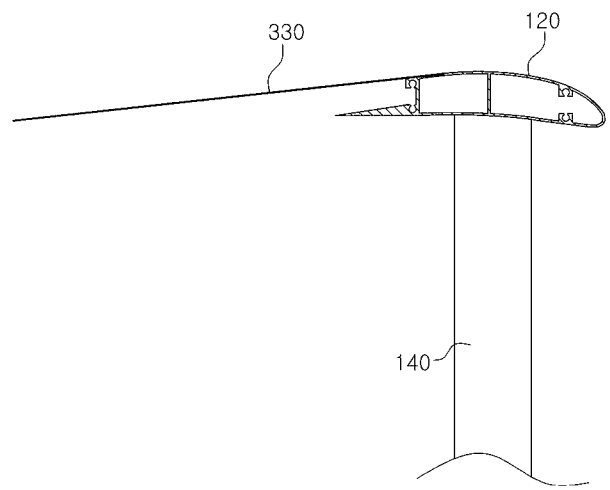
FIG. 7 is an enlarged view illustrating a third alternative embodiment of an auxiliary blade provided at the rotor for wind power generation according to the exemplary embodiment of the present invention.

FIG. 7 is an enlarged view illustrating a third alternative embodiment of an auxiliary blade provided at the rotor for wind power generation according to the exemplary embodiment of the present invention.

As shown in FIG. 7, the auxiliary blade 330 according to the third alternative embodiment has approximately the same configuration as the auxiliary blade 130 of the above described embodiment, except for the fact that the auxiliary blade may be coupled to the outer surface of the main blade 120.

When viewed from the top, the auxiliary blade 330 of the third alternative embodiment may extend longer beyond the distal end of the main blade 120. In this case, a rear end of the main blade 120, to which the auxiliary blade 330 is coupled, may have a cut shape. That is, a rear portion of the main blade 120 to which the auxiliary blade 330 is coupled is cut away, and only a front portion of the main blade 120 remains.

Through the auxiliary blade 330 having the above described configuration, the main blade 120 is configured such that a portion thereof is cut away, which may achieve a remarkable reduction in the weight of the rotor 100 for wind power generation, and may ensure that the auxiliary blade 330 is bent flexibly according to the direction of wind. In this way, it is possible to reduce wind resistance in a rotating direction of the rotor 100 for wind power generation, and to increase lift and drag force owing to bending of the auxiliary blade, resulting in an enhancement in power generation efficiency.

Figure 8:
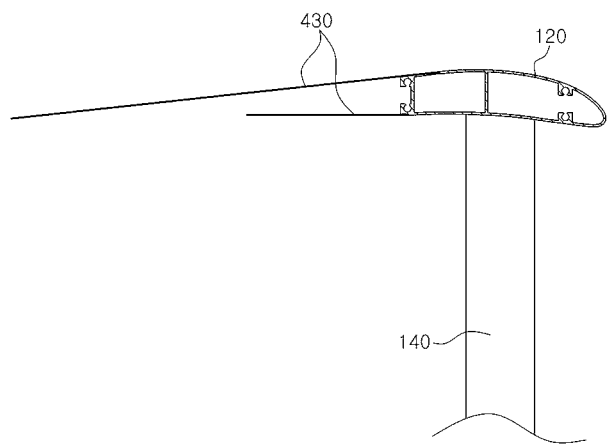
FIG. 8 is an enlarged view illustrating a fourth alternative embodiment of an auxiliary blade provided at the rotor for wind power generation according to the exemplary embodiment of the present invention.
Figure 9:
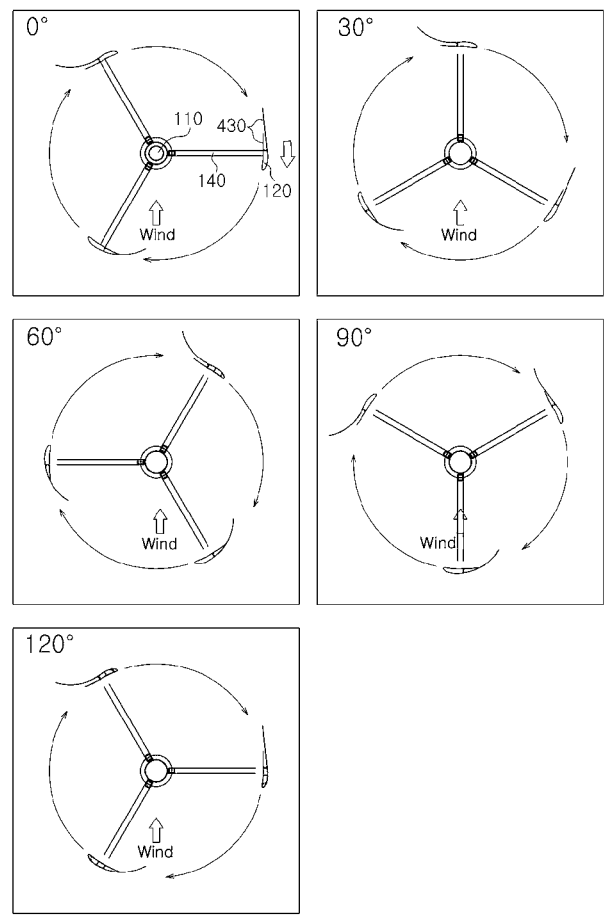
FIG. 9 is a view illustrating operational modes of the rotor for wind power generation, to which the auxiliary blade according to the fourth alternative embodiment as shown in FIG. 8 is applied.

FIG. 8 is an enlarged view illustrating a fourth alternative embodiment of an auxiliary blade provided at the rotor for wind power generation according to the exemplary embodiment of the present invention, and FIG. 9 is a view illustrating operational modes of the rotor for wind power generation, to which the auxiliary blade according to the fourth alternative embodiment as shown in FIG. 8 is applied. FIG. 9 illustrates differently rotated states of the rotor for wind power generation by an angle of 30 degrees from 0 degrees to 120 degrees.

As shown in FIG. 8, the auxiliary blade 430 according to the fourth alternative embodiment has approximately the same configuration as the auxiliary blade 130 of the above described embodiment, except for the fact that a pair of auxiliary blades may be coupled to opposite sides of the main blade 120.

Specifically, when viewed from the top, the pair of auxiliary blades 430 of the fourth alternative embodiment may be coupled respectively to the inner surface and the outer surface of the main blade 120 so as to be spaced apart from each other.

In this case, as the auxiliary blades 430 are coupled to the main blade 120 so as to cover a portion of the main blade 120, the portion of the main blade 120 covered by the auxiliary blades 430 may be cut away, which may achieve a remarkable reduction in the weight of the rotor 100 for wind power generation.

Of the pair of auxiliary blades 430, any one auxiliary blade 430 may have a smaller length than that of the other one, such that the longer auxiliary blade 430 may be more easily bent than the smaller auxiliary blade 430.

In the auxiliary blades 430 of the fourth alternative embodiment, the auxiliary blade coupled to the inner surface of the main blade 120 has a smaller length.

In the case of the auxiliary blades 430 according to the fourth alternative embodiment having the above described configuration, as shown in FIG. 9, assuming that wind blows in a given direction, the auxiliary blades 430 may be bent flexibly according to the direction of wind, thereby serving to reduce initial air drift and generating optimal lift and drag force considering the direction of wind.

For example, on the basis of the auxiliary blade 430 oriented in a range from the zero degree position to the 3 O'clock position, the auxiliary blade 430 located at the zero degree position is aligned on the straight line of the main blade 120 so as not to be affected by wind resistance. On the other hand, when rotated by an angle of 120 degrees, the auxiliary blade 430 located at the outer surface of the main blade 120 may be more bent than the auxiliary blade 430 located at the inner surface of the main blade such that distal ends of both the auxiliary blades 430 come into contact with each other, i.e. such that both the auxiliary blades define an airfoil structure, which may increase lift and drag force and minimize wind resistance in a rotating direction of the main blade.

Figure 10:
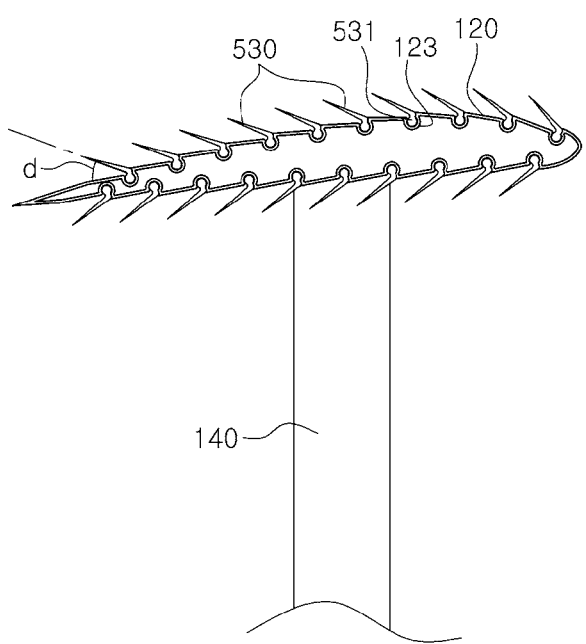
FIG. 10 is an enlarged view illustrating a fifth alternative embodiment of an auxiliary blade provided at the rotor for wind power generation according to the exemplary embodiment of the present invention.
Figure 11:
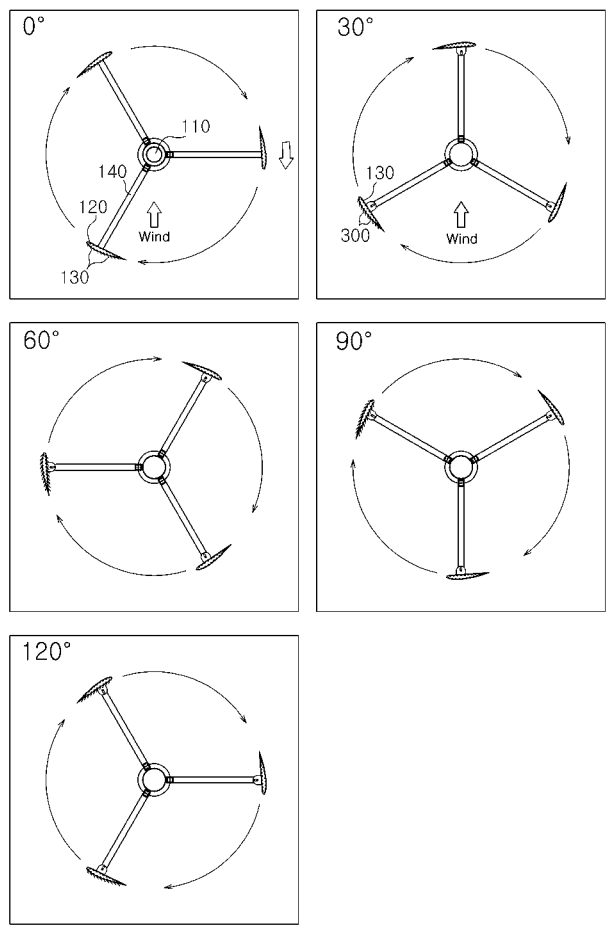
FIG. 11 is a view illustrating operational modes of the rotor for wind power generation, to which the auxiliary blade according to the fifth alternative embodiment as shown in FIG. 10 is applied.

FIG. 10 is an enlarged view illustrating a fifth alternative embodiment of an auxiliary blade provided at the rotor for wind power generation according to the exemplary embodiment of the present invention, and FIG. 11 is a view illustrating operational modes of the rotor for wind power generation, to which the auxiliary blade according to the fifth alternative embodiment as shown in FIG. 10 is applied. FIG. 11 illustrates differently rotated states of the rotor for wind power generation by an angle of 30 degrees from 0 degrees to 120 degrees.

As shown in FIG. 10, the auxiliary blade 530 according to the fifth alternative embodiment has approximately the same configuration as the auxiliary blade 130 of the above described embodiment, except for the fact that a plurality of auxiliary blades 530 may be coupled to the outer surface of the main blade 120.

In the fifth alternative embodiment, the plurality of auxiliary blades 530 may be coupled to the outer surface of the main blade 120 so as to be spaced apart from one another by a constant distance, and may extend by a long length in a vertical direction of the main blade 120 so as to be tilted to the distal end of the main blade 120. In this case, the auxiliary blades 530 coupled to the inner surface and the outer surface of the main blade 120 are tilted to the same distal end of the main blade 120, thereby having a finlike shape.

In this case, the auxiliary blades 530 are preferably tilted from the outer surface of the main blade 120 to the distal end within a range of 5 degrees to 60 degrees. If the tilt angle d of the auxiliary blades 530 is less than 5 degrees, the auxiliary blades 530 may easily come into contact with the main blade 120 under the influence of wind colliding with the auxiliary blades 530 during rotation of the rotor 100 for wind power generation. Thus, installation of the auxiliary blades 530 may be ineffective. If the tilt angle d is greater than 60 degrees, the auxiliary blades 530 may increase wind resistance during rotation of the rotor 100 for wind power generation, which may cause deterioration in power generation efficiency.

Meanwhile, the plurality of auxiliary blades 530 may be pivotally rotatably coupled to the main blade 120 via hinges 531. In this case, each of the auxiliary blades 530 is integrally provided at a distal end thereof with the hinge 531, and the main blade 120 is provided with a hinge insertion recess 123 for insertion of the hinge 531. Thus, as the hinge 531 formed at the auxiliary blade 530 is inserted into the hinge insertion recess 123, the auxiliary blade 530 may be pivotally rotatably coupled to the main blade 120.

In the case of the auxiliary blade 530 according to the fifth alternative embodiment having the above described configuration, as shown in FIG. 11, assuming that wind blows in a given direction, the auxiliary blade 530 is stretched out from the main blade 120 to increase drag force in a state in which the main blade 120 turns its back on the wind (see the main blade located at the 9 o'clock position when rotated by an angle of 60 degrees as shown in FIG. 10), thereby achieving an enhancement in the rotational power of the rotor 100 for wind power generation. Also, in a state in which the main blade 120 is oriented to face the wind (see the main blade located at the 3 o'clock position when rotated by an angle of 0 degrees or 120 degrees as shown in FIG. 10), the auxiliary blade 530 comes into close contact with the outer surface of the main blade 120, thereby reducing wind resistance upon rotation of the rotor 100 for wind power generation.

Accordingly, in the case in which the main blade 120 turns its back on wind, it has an increased contact area with wind, resulting in an increase in lift and drag force. In the case in which the main blade 120 is oriented to face wind, it reduces wind resistance, resulting in an enhancement in power generation efficiency.

Figure 12:
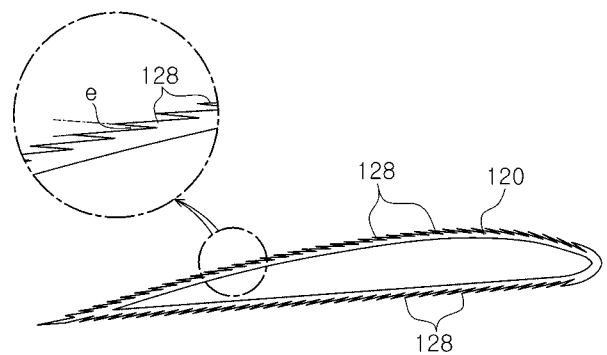
FIG. 12 is an enlarged view illustrating a main blade provided at a rotor for wind power generation according to another exemplary embodiment of the present invention.

FIG. 12 is an enlarged view illustrating a main blade provided at a rotor for wind power generation according to another exemplary embodiment of the present invention.

As shown in FIG. 12, the rotor 100 for wind power generation according to the present embodiment has the same configuration as that of the above described embodiment. The same constituent elements are designated by the same reference numerals and have the same operational effects, and thus a detailed description thereof will be omitted hereinafter.

The rotor 100 for wind power generation according to the present embodiment has the same configuration as that of the above described embodiment, except for the fact that the main blade 120 may be further provided with protruding pieces 128.

The protruding pieces 128 may take the form of protrusions having pointed distal ends provided at the outer surface of the main blade 120. A plurality of the protruding pieces 128 may extend by a long length in a vertical direction of the outer surface of the main blade 120, and may be tilted to the distal end of the main blade 120.

By providing the main blade 120 with the protruding pieces 128, it is possible to allow wind to be caught between the outer surface of the main blade 120 and the protruding pieces 128, which may increase lift and drag force.

In this case, the protruding pieces 128 are preferably tilted from the outer surface of the main blade 120 to the distal end of the main blade 120 within a range of 5 degrees to 60 degrees. If the tilt angle e of the protruding pieces 128 is less than 5 degrees, only an insufficient amount of wind is caught between the outer surface of the main blade 120 and the protruding pieces 128 during rotation of the rotor 100 for wind power generation. Thus, formation of the protruding pieces 128 may be ineffective. If the tilt angle e of the protruding pieces 128 is greater than 60 degrees, the protruding pieces 128 may increase wind resistance during rotation of the rotor 100 for wind power generation, which may cause deterioration in power generation efficiency.

Through formation of the protruding pieces 128, it is possible not only to increase a contact area between the main blade 120 and the wind, resulting in an increase in lift and drag force, but also to achieve a further increase in lift and drag force owing to the wind caught between the main blade 120 and the protruding pieces 128.

Figure 13:
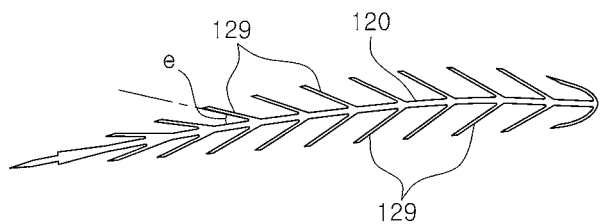
FIG. 13 is an enlarged view illustrating an alternative embodiment of the main blade provided at the rotor for wind power generation according to the secondly described exemplary embodiment of the present invention.

FIG. 13 is an enlarged view illustrating an alternative embodiment of the main blade provided at the rotor for wind power generation according to the secondly described exemplary embodiment of the present invention.

As shown in FIG. 13, the rotor for wind power generation according to the alternative embodiment has the same configuration as the main blade 120 of the embodiment of FIG. 12, except for the fact that the main blade 120 is provided with protruding pieces 129.

In the alternative embodiment, the protruding pieces 129 and the main blade 120 may take the form of a plate. Specifically, a plurality of protruding pieces 129 in the form of a plate may be formed at the main blade 120 so as to be tilted to the distal end of the main blade 120.

In this case, the protruding pieces 129 are preferably tilted from the outer surface of the main blade 120 to the distal end of the main blade within a range of 5 degrees to 60 degrees. If the tilt angle e of the protruding pieces 129 is less than 5 degrees, only an insufficient amount of wind is caught between the outer surface of the main blade 120 and the protruding pieces 129 during rotation of the rotor 100 for wind power generation. Thus, formation of the protruding pieces 129 may be ineffective. If the tilt angle e of the protruding pieces 129 is greater than 60 degrees, the protruding pieces 128 may increase wind resistance during rotation of the rotor 100 for wind power generation, which may cause deterioration in power generation efficiency.

When distal ends of the respective neighboring protruding pieces 129 are connected to each other, the protruding pieces 129 may generally have a streamlined profile. One of the protruding pieces 129 located at the distal end opposite to a tilting direction of the protruding pieces 129 may have a circular arc shape to minimize wind resistance upon rotation of the rotor 100 for wind power generation. The protruding pieces 129 may be integrally formed with the main blade 120.

Accordingly, it is possible not only to increase a contact area between the main blade 120 and the wind, resulting in an increase in lift and drag force, but also to achieve a further increase in lift and drag force owing to the wind caught between the main blade 120 and the protruding pieces 129.

Figure 14:
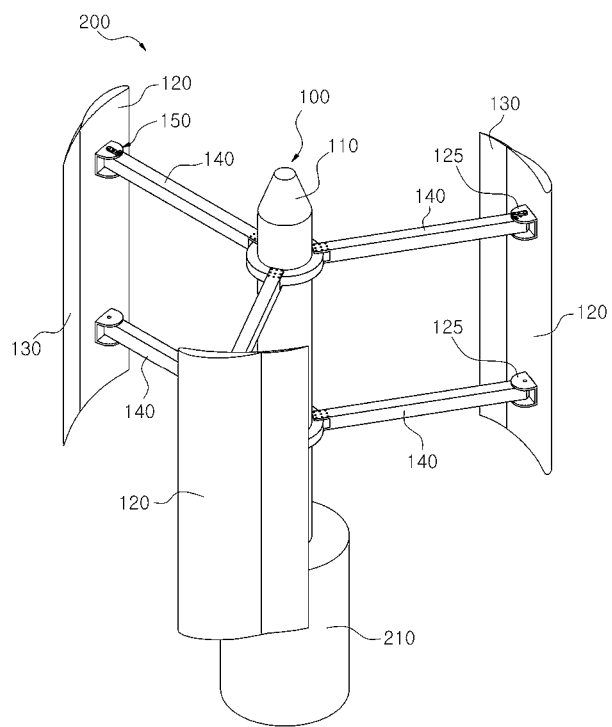
FIG. 14 is a perspective view illustrating a wind power generation apparatus according to an exemplary embodiment of the present invention.
Figure 15:
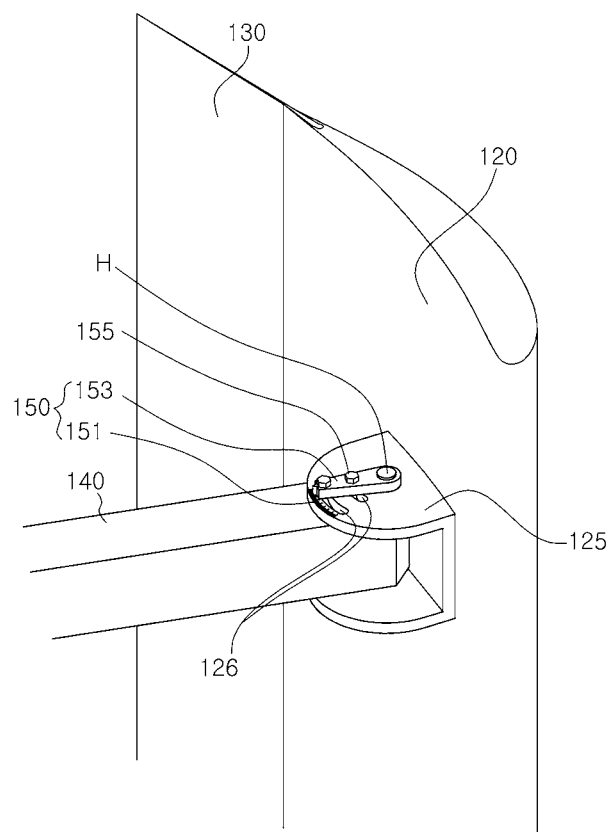
FIG. 15 is an enlarged view illustrating an angle meter installed to the wind power generation apparatus according to the exemplary embodiment of the present invention.

FIG. 14 is a perspective view illustrating a wind power generation apparatus according to an exemplary embodiment of the present invention, and FIG. 15 is an enlarged view illustrating an angle meter installed to the wind power generation apparatus according to the exemplary embodiment of the present invention.

As shown in FIGS. 14 and 15, the wind power generation apparatus 200 according to the embodiment of the present invention includes a generator 210. The generator 210 serves to convert rotational power into electric energy. The generator 210 generates electricity via induced electromotive force by rotating a coil wound on a drive shaft between magnets or by rotating a magnet attached to the drive shaft between coils. The generator 210 may be a known generator, and thus a detailed description thereof will be omitted hereinafter.

The wind power generation apparatus 200 may include the rotor 100 for wind power generation. The rotor 100 for wind power generation may rotate the generator 210 using lift and drag force generated by wind collision. Meanwhile, the rotor 100 for wind power generation and the generator 210 may be connected to each other via a power transmission member, such as a belt or a chain, to enable driving of the generator 210. Alternatively, the rotor 100 may be directly coupled to the generator 210 so as to rotate the generator 210.

The rotor 100 for wind power generation may have the same configuration as the above described rotor 100 for wind power generation according to the above described embodiments and other alternative embodiments, and thus a detailed description thereof will be omitted hereinafter. The rotor of the following description is referred to as the rotor 100 for wind power generation according to the firstly described embodiment of the present invention, and thus only different detailed configurations will be described hereinafter.

The rotor 100 for wind power generation included in the wind power generation apparatus 200 may be configured such that the main blades 120 are pivotally rotatably coupled to the support member 140 using hinges H. In this case, to realize pivotal rotation of the main blades 120 coupled to the support member 140, each main blade 120 may be coupled to a bracket 125 such that the bracket 125 is coupled to the support member 140 using the hinge H.

The wind power generation apparatus 200 may include an angle meter 150. The angle meter 150 may indicate a pivotally rotated angle of the main blade 120. The angle meter 150 may include angle graduations 151, and an index member 153 to point out the angle graduations 151. In this case, any one of the support member 140 and the main blade 120 may be provided with the graduations 151, and the other one may be provided with the index member 153.

In the present embodiment, the graduations 151 are marked on the bracket 125 so as to be located conically with the hinge H, and the index member 153 is coupled to the support member 140 so as to point out the graduations 151 marked on the bracket 125.

The index member 153 may be located on an upper surface of the bracket 125, and a fastening member 155 may sequentially penetrate the index member 153, the bracket 125, and the support member 140 to fasten the index member 153 to the bracket 125. In this case, the bracket 125 has a circular arc shaped guide hole 126 for penetration of the fastening member 155, and the guide hole 126 may be conically formed with the hinge.

Accordingly, as the bracket 125 located between the index member 153 and the support member 140 is pressed by fastening force of the fastening member 155 penetrating the index member 153 and the support member 140, the main blade 120 may be fixed in pivotally rotated state.

In the wind power generation apparatus 100 having the above described configuration, when it is desired to adjust the angle of the main blade 120, the fastening member 155 is released to remove pressure applied to the bracket 125 to some extent rather than being completely unfastened, thereby allowing pivotal rotation of the main blade 120. On the contrary, when it is desired to fix the main blade 120, the fastening member 155 is tightened to apply pressure to the bracket 135 using fastening force of the index member 153 and the support member 140, thereby allowing the main blade 120 to be fixed.

In this way, the pivotal rotation angle of the main blade 120 may be adjusted using the angle meter 150, which may enable fine adjustment in the angle of the main blade 120. Further, by fixing and releasing the main blade 120 using fastening force of the index member 153 and the support member 140, it is possible to facilitate easy adjustment in the angle of the main blade 120.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A rotor for wind power generation comprising:
   a vertically or horizontally oriented rotating shaft;
   a plurality of main blades equidistantly spaced apart from one another; and
   a plurality of auxiliary blades coupled to each of the plurality of main blades, each of the plurality of auxiliary blades being spaced from each other in a chord-wise direction and configured to be bent according to a direction of wind,
   wherein each of the plurality of auxiliary blades is coupled to a distal end of each of the plurality of main blades so as to extend from each of the plurality of main blades,
   wherein each of the plurality of main blades has a plurality of boss insertion recesses located at the distal end thereof, and each of the plurality of auxiliary blades has an insertion boss located at a proximal end thereof, such that each of the plurality of main blades and the plurality of auxiliary blades are coupled to each other as the insertion boss is inserted into each of the plurality of boss insertion recesses,
   wherein the plurality of auxiliary blades are arranged at a same elongated surface of each of the plurality of main blades in a longitudinal direction of each of the plurality of main blades, wherein a thickness of each of the plurality of auxiliary blades is gradually reduced as each of the plurality of auxiliary blades extends from the distal end of each of the plurality of main blades, and wherein each of the plurality of auxiliary blades is coated with a soft material to reduce friction noise in the wind.

2. The rotor for wind power generation according to claim 1, wherein each of the plurality of auxiliary blades is coupled to an outer surface of each of the plurality of main blades and extends longer beyond the distal end of each of the plurality of main blades.

3. The rotor for wind power generation according to claim 1, wherein the plurality of auxiliary blades is coupled to an inner surface of each of the plurality of main blades and extends longer beyond the distal end of each of the plurality of main blades.

4. The rotor for wind power generation according to claim 1, wherein the plurality of auxiliary blades are configured to be tilted to a distal end of each of the plurality of main blades.

5. The rotor for wind power generation according to claim 4, wherein a tilt angle of each of the plurality of auxiliary blades is within a range of 5 degrees to 60 degrees with respect to an outer surface of the main blade.

6. The rotor for wind power generation according to claim 4, wherein each of the plurality of auxiliary blades is pivotally rotatably coupled to each of the plurality of main blades via a hinge.

* * * * *